(12) United States Patent
Handa et al.

(10) Patent No.: US 11,186,701 B2
(45) Date of Patent: Nov. 30, 2021

(54) BIAXIALLY ORIENTED POLYESTER FILM

(71) Applicant: TOYOBO FILM SOLUTIONS LIMITED, Tokyo (JP)

(72) Inventors: Makoto Handa, Tokyo (JP); Shinji Muro, Tokyo (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 17/006,015

(22) Filed: Aug. 28, 2020

(65) Prior Publication Data

US 2021/0061974 A1 Mar. 4, 2021

(30) Foreign Application Priority Data

Sep. 2, 2019 (JP) .............................. JP2019-159815

(51) Int. Cl.
*C08K 3/36* (2006.01)
*C08L 67/03* (2006.01)
(Continued)

(52) U.S. Cl.
CPC .............. *C08K 3/36* (2013.01); *B32B 27/08* (2013.01); *B32B 27/18* (2013.01); *B32B 27/36* (2013.01); *C08L 67/03* (2013.01); *B32B 3/00* (2013.01); *B32B 2250/244* (2013.01); *B32B 2264/0235* (2013.01); *B32B 2307/514* (2013.01); *B32B 2307/518* (2013.01); *B32B 2367/00* (2013.01); *C08K 3/013* (2018.01); *C08L 67/00* (2013.01); *C08L 67/02* (2013.01); *C08L 2203/16* (2013.01); *C08L 2205/025* (2013.01); *G11B 5/66* (2013.01); *G11B 5/70* (2013.01); *Y10T 428/24355* (2015.01); *Y10T 428/31786* (2015.04)

(58) Field of Classification Search
None
See application file for complete search history.

(56) References Cited

U.S. PATENT DOCUMENTS 4,348,446 A * 9/1982 Mitsuishi ............... C08K 3/013
428/148
4,505,966 A * 3/1985 Adachi .................... G11B 5/64
204/192.2
(Continued)

FOREIGN PATENT DOCUMENTS

JP 62-077923 A * 4/1987
JP 62-193889 A * 8/1987
(Continued)

*Primary Examiner* — Vivian Chen
(74) *Attorney, Agent, or Firm* — Leydig, Voit & Mayer, Ltd.

(57) ABSTRACT

A biaxially oriented polyester film, which exhibits an excellent winding property in a manufacturing process, and realizes an excellent electromagnetic conversion property and less failure of signals of a magnetic recording tape to be produced thereof, is provided. This biaxially oriented polyester film satisfies the formula $y \leq -24.9X+3.8$, where the protrusion height X is 0.075 μm, 0.100 μm, and 0.125 μm, and y denotes a base-10 logarithm value of the number of protrusions having protrusion heights of X or more in a visual field of a region of 282 μm×211 μm, and a protrusion height that corresponds to a 0.4% area of a bearing curve based on protrusion height distribution is 65-90 nm.

8 Claims, 1 Drawing Sheet

(51) Int. Cl.
*B32B 27/08* (2006.01)
*B32B 27/36* (2006.01)
*B32B 27/18* (2006.01)
*C08K 3/013* (2018.01)
*B32B 3/00* (2006.01)
*C08L 67/00* (2006.01)
*C08L 67/02* (2006.01)
*G11B 5/66* (2006.01)
*G11B 5/70* (2006.01)

(56) References Cited

U.S. PATENT DOCUMENTS

| | | | | |
|---|---|---|---|---|
| 4,539,389 A * | 9/1985 | Kiriyama | ............ | G11B 5/73937 528/272 |
| 4,680,217 A * | 7/1987 | Kanesaki | ............ | G11B 5/73927 428/141 |
| 4,720,412 A * | 1/1988 | Katoh | ............ | C08J 5/18 428/141 |
| 4,732,814 A * | 3/1988 | Hatada | ............ | C08J 5/18 428/480 |
| 4,865,898 A * | 9/1989 | Fukuda | ............ | G11B 5/73935 428/141 |
| 4,952,449 A * | 8/1990 | Okazaki | ............ | G11B 5/73937 428/147 |
| 4,990,400 A * | 2/1991 | Endo | ............ | C08J 5/18 428/331 |
| 5,045,379 A * | 9/1991 | Kotani | ............ | G11B 5/73935 428/156 |
| 5,047,278 A * | 9/1991 | Ono | ............ | G11B 5/73927 428/141 |
| 5,270,096 A * | 12/1993 | Kato | ............ | G11B 5/73935 428/143 |
| 5,318,823 A * | 6/1994 | Utsumi | ............ | G11B 5/73935 428/143 |
| 5,328,745 A * | 7/1994 | Kurihara | ............ | C08J 7/043 428/141 |
| 5,429,855 A * | 7/1995 | Kotani | ............ | B32B 27/08 428/141 |
| 5,470,637 A * | 11/1995 | Sakamoto | ............ | G11B 5/73931 428/143 |
| 5,474,854 A * | 12/1995 | Kagami | ............ | C08J 5/18 428/482 |
| 5,494,739 A * | 2/1996 | Chuujou | ............ | G11B 5/73929 428/323 |
| 5,496,618 A * | 3/1996 | Kurihara | ............ | G11B 5/733 428/198 |
| 5,534,323 A * | 7/1996 | Chuujou | ............ | C08J 5/18 428/847.3 |
| 5,674,589 A * | 10/1997 | Bennett | ............ | B29C 55/005 428/149 |
| 5,679,453 A * | 10/1997 | Konagaya | ............ | C08J 7/046 428/327 |
| 6,124,031 A * | 9/2000 | Yoshida | ............ | C08J 5/18 428/329 |
| 6,194,054 B1 * | 2/2001 | Peiffer | ............ | B32B 37/153 428/141 |
| 6,537,657 B1 * | 3/2003 | Watanabe | ............ | B41M 5/41 428/331 |
| 6,551,686 B1 * | 4/2003 | Hellmann | ............ | B32B 27/36 428/141 |
| 6,670,030 B1 * | 12/2003 | Uchida | ............ | G11B 5/73929 428/323 |
| 2001/0044009 A1 * | 11/2001 | Peiffer | ............ | B32B 7/02 428/141 |
| 2001/0055674 A1 * | 12/2001 | Hellman | ............ | G11B 5/73935 428/216 |
| 2002/0167111 A1 * | 11/2002 | Tsunekawa | ............ | G11B 5/73935 264/210.7 |
| 2003/0162056 A1 * | 8/2003 | Ono | ............ | G11B 5/73929 428/847.2 |
| 2003/0165665 A1 * | 9/2003 | Kobayashi | ............ | G11B 5/73935 428/141 |
| 2004/0043194 A1 * | 3/2004 | Ono | ............ | G11B 5/73931 428/143 |
| 2005/0170216 A1 * | 8/2005 | Ejiri | ............ | G11B 5/73927 428/846.9 |
| 2007/0265383 A1 * | 11/2007 | Ogawa | ............ | C08L 67/02 524/440 |

FOREIGN PATENT DOCUMENTS

| | | | |
|---|---|---|---|
| JP | 62-233227 A | * | 10/1987 |
| JP | 63-247076 A | * | 10/1988 |
| JP | 2019-116093 A | | 7/2019 |
| JP | 2019-159815 A | | 9/2019 |

* cited by examiner

BIAXIALLY ORIENTED POLYESTER FILM

BACKGROUND OF THE INVENTION

Field of the Invention

The present invention relates to a biaxially oriented polyester film, and this film is useful in the application or the like which requires an extremely smooth surface property, such as a base film to be used for an ultra high density recording medium of, for example, more than 5 TB (Tera Bytes).

Description of the Related Art

Recently, according to the increase of data volume required to be dealt in computer systems and the like, significant increase of capacities to be recorded into magnetic recording media have been sought. For attaining high density recording by highly smoothening a surface property of such a magnetic recording medium, a surface of a base film is also preferably smoothened. However, as smoother the surface of the base film is, it is harder to expel air between layers of a roll-shaped film in a process of manufacturing a base film, thereby leading to problems of the reduction in productivity such as easily generating wrinkles while winding the product.

Thus, a rough surface having a certain level of roughness is formed on one surface of the base film, and a flat surface having small roughness is formed on the other surface, so that a magnetic layer is formed on the flat surface. For example, JP-A-2019-116093 suggests (hereinafter, referred to as Patent Document 1) forming a rough surface and a flat surface by adopting double layer-structured polyester films, and controlling an average particle diameter and a content amount of inert particles contained in each layer of the polyester films so that particle-containing voids on the surface of each layer may be within a specified range.

SUMMARY OF THE INVENTION

However, it has been found that, for attaining the high density recording by highly smoothening the surface property of the magnetic recording medium, influence of the surface shape of the rough surface of the base film is also increased, and protrusions on the rough surface are transferred to the surface of the magnetic layer, whereby a failure of signals may be caused.

It has been found that, in the application which requires an extremely smooth surface property, such as a base film to be used for, in particular, an ultra high density recording medium of more than 5 TB, protrusion heights and a protrusion frequency on the rough surface are required to be highly controlled. Then, Patent Document 1 solely controls density of voids that can generate protrusions in a polyester film, and thus is insufficient as the method for highly controlling the protrusion height and the protrusion frequency on the rough surface.

Then, the purpose of the present invention is to provide a biaxially oriented polyester film which exhibits an excellent winding property in a process of manufacturing a base film, and realizes an excellent electromagnetic conversion property and less failure of signals of a magnetic recording tape to be produced thereof.

As a result of intensive study for solving the above-described problems, the inventors of the present invention have found that both of an electromagnetic conversion property and decrease of signal failures (hereinafter, they may be generally called as "electromagnetic recording properties") of a recording magnetic tape to be produced thereof, and a winding property in a base film manufacturing process can be achieved by controlling respective frequencies of plural protrusion heights and a height of a 0.4% area of a bearing curve of the rough side surface, based on distribution of the protrusion heights that are obtained by a contactless surface shape measurement device, thereby reaching the present invention.

That is, following contents are included in the present invention.

(1) A biaxially oriented polyester film, wherein a logarithm value y of a protrusion frequency of protrusions having protrusion heights of X or more on at least one surface, which is measured by a contactless surface shape measurement device, satisfies a below relation formula (1), where the protrusion height X is 0.075 μm, 0.100 μm and 0.125 μm, $$y \leq -24.9X + 3.8 \tag{1}$$

(herein, X denotes a protrusion height (μm), y denotes a base-10 logarithm value of a protrusion number of protrusions having protrusion heights of X or more in a visual field of a region of 282 μm×211 μm), and a protrusion height that corresponds to a 0.4% area of a bearing curve based on protrusion height distribution is 65 nm or more and less than 90 nm.

(2) The biaxially oriented polyester film described in (1), wherein polyester contained in the biaxially oriented polyester film has ethylene terephthalate or ethylene-2,6-naphthalenedicarboxylate as a main repeating unit.

(3) The biaxially oriented polyester film described in (1) or (2), wherein, when measuring the one surface and an other surface of the biaxially oriented polyester film by a contactless surface shape measurement device, center line average surface roughness of the one of the surfaces is higher than center line average surface roughness of the other surface by 1 nm or more.

(4) The biaxially oriented polyester film described in any of (1) to (3), including inert particles.

(5) The biaxially oriented polyester film described in any of (1) to (4), including two or more layers of different polyester layers laminated.

The biaxially oriented polyester film of the present invention exhibits an excellent winding property in a process of manufacturing a base film such as a base film used for an ultra high density recording medium of 5 TB or more, and realizes an excellent electromagnetic conversion property and less failure of signals of a magnetic recording tape to be produced thereof. Thus, for example, in the case where the biaxially oriented polyester film of the present invention is used for a magnetic recording tape, higher recording density can be realized, and a data storage or the like having a high memory capacity can be provided.

DETAILED DESCRIPTION OF THE PREFERRED EMBODIMENTS

Figure 1:
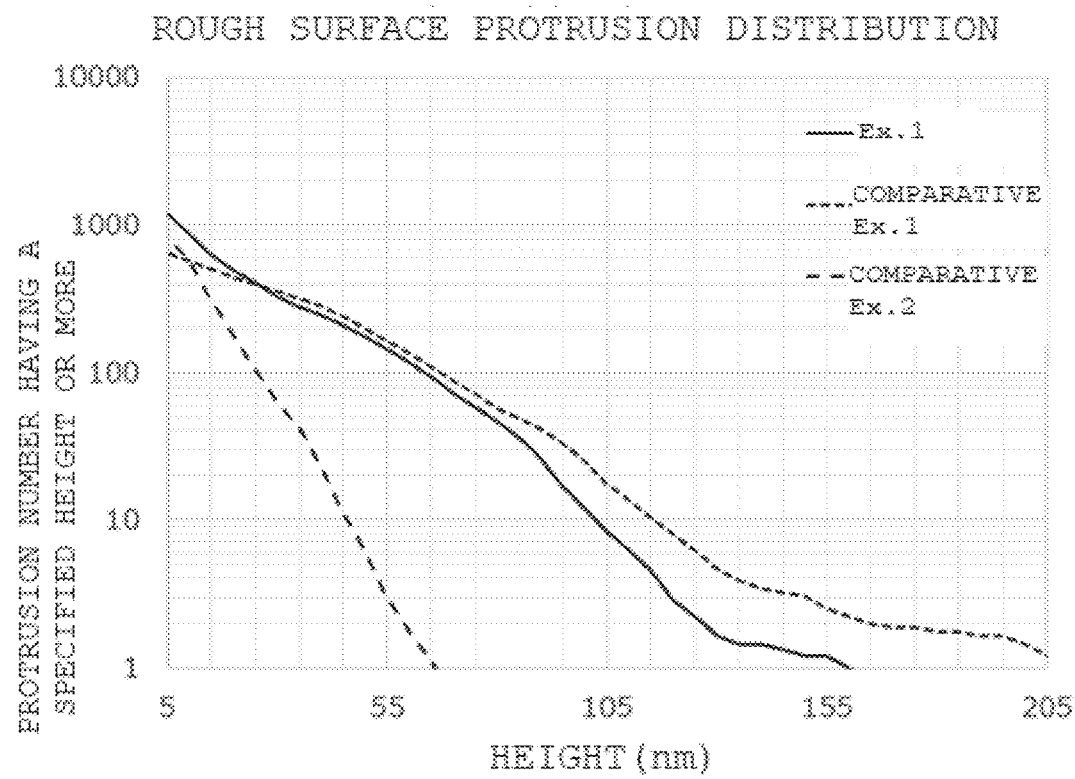
FIG. 1 is a graph showing relations between protrusion heights and frequencies of rough surfaces of biaxially oriented polyester films obtained in Example 1 and Comparative Examples 1 and 2, which are measured by a contactless surface shape measurement device.

The present invention will be described below in detail. Incidentally, for convenience of explanation, a direction for forming a film may be called as a mechanical axis direction, a vertical direction, a longitudinal direction or an MD direction, and a direction perpendicular to the film formation direction and a thickness direction may be called as a width direction, a transverse direction or a TD direction.

[Biaxially Oriented Polyester Film]

The biaxially oriented polyester film of the present invention contains polyester as a main resin component, and the polymer obtains orientation in biaxial directions by biaxial stretching or the like of the film. Incidentally, the "main resin component" means that the polyester is contained by 50% by mass or more in the resin component, preferably by 70% by mass or more, more preferably by 80% by mass or more, and most preferably by 90% by mass or more.

A logarithm value y of a protrusion frequency of protrusions having heights of X or more on at least one surface of the biaxially oriented polyester film of the present invention, which is measured by a contactless surface shape measurement device, satisfies a below relation formula (1), where the protrusion height X is 0.075 μm, 0.100 μm and 0.125 μm.

$$y \leq 24.9X + 3.8 \tag{1}$$

Herein, X denotes a protrusion height (μm), y denotes a base-10 logarithm value of a protrusion number of protrusions having protrusion heights of X or more in a visual field of a region of 282 μm×211 μm. Further, as the contactless surface shape measurement device, a product name of NewView7300 produced by Zygo Corporation was used, and can adopt: measurement magnification of 25 times by using a 50× objective lens at zoom magnification of 0.5 times; and a measurement area of 282 μm×211 μm (=0.0595 mm$^2$), as measurement conditions. Incidentally, the protrusion frequency is obtained by: obtaining a protrusion number by summing protrusions in every 0.005 μm of the protrusion height; and integrating the protrusions having the protrusion height of X or more.

That is, where the protrusion heights are $X_1$=0.075 μm, $X_2$=0.100 μm and $X_3$=0.125 μm, y is obtained by: obtaining a protrusion frequency $Y_1$, $Y_2$ or $Y_3$ of the protrusions that have the protrusion height of $X_1$ or more, $X_2$ or more or $X_3$ or more; and obtaining a base-10 logarithm value of $y_1$=log$Y_1$, $y_2$=log$Y_2$ or $y_3$=log$Y_3$. Satisfying the relation formula (1) means that all of the respective relations between $X_1$ and $y_1$, $X_2$ and $y_2$ and $X_3$ and $y_3$ satisfy $y \leq -24.9X + 3.8$ (1).

If the relation between X and y does not satisfy the relation formula (1), that is, in the case where the frequencies of the protrusion numbers of the protrusions that have the protrusion heights of 0.075 μm, 0.100 μm and 0.125 μm are large, failure of signals is likely to be caused by the transfer of the protrusions to the surface of the magnetic layer when the magnetic recording medium is produced thereof. Accordingly, although the protrusion heights and their frequencies are required to be highly controlled in the application that requires an extremely smooth surface property, such as a base film to be used for, in particular, a ultra high density recording medium of more than 5 TB, controlling the respective frequencies of the plural protrusion heights based on distribution of the protrusion heights, which are obtained from the measurement of the rough surface by the contactless surface shape measurement device as the present invention, is considered to be able to effectively suppress the failure of signals that are caused by the transfer of the protrusions to the surface of the magnetic layer when a magnetic recording medium is produced thereof.

Incidentally, the reason why the relation of the linear inequality of the protrusion heights X is specified with respect to the logarithm values y of the respective frequencies, when controlling the respective frequencies of the plural protrusion heights, is because this relation is preferable as the condition for effectively preventing the property from being degraded by the transfer of the protrusions to the magnetic layer surface when a magnetic tape is produced thereof. For example, as shown in FIG. 1, the relation between the logarithm values of the respective frequencies along a vertical axis and the protrusion heights along a horizontal axis becomes important.

From the above-described point of view, instead of the relation formula (1), a relation formula (1') is preferably satisfied, and a relation formula (1'') is more preferably satisfied.

$$y \leq -24.9X + 3.7 \tag{1'}$$

$$-24.9X + 2.0 \leq y \leq -24.9X + 3.5 \tag{1''}$$

Further, the protrusion height of the biaxially oriented polyester film of the present invention, which corresponds to a 0.4% area of the baring curve based on the protrusion height distribution that is obtained from the measurement by the contactless surface shape measurement device (that is, the above-described measurement of the respective frequencies of the plural protrusion heights), is 65 nm or more and less than 90 nm (hereinafter, this property and a property of satisfying the relation formula (1) are generally called as the "surface property of the present invention"). In the case where this height is less than the lower limit, wrinkles are generated while winding the product, thereby causing the reduction in productivity. On the other hand, in the case where this height is more than the higher limit, failure of signals and reduction in output are likely to be caused by the transfer of the protrusions to the magnetic layer surface when the magnetic recording medium is produced thereof.

Figure 2:
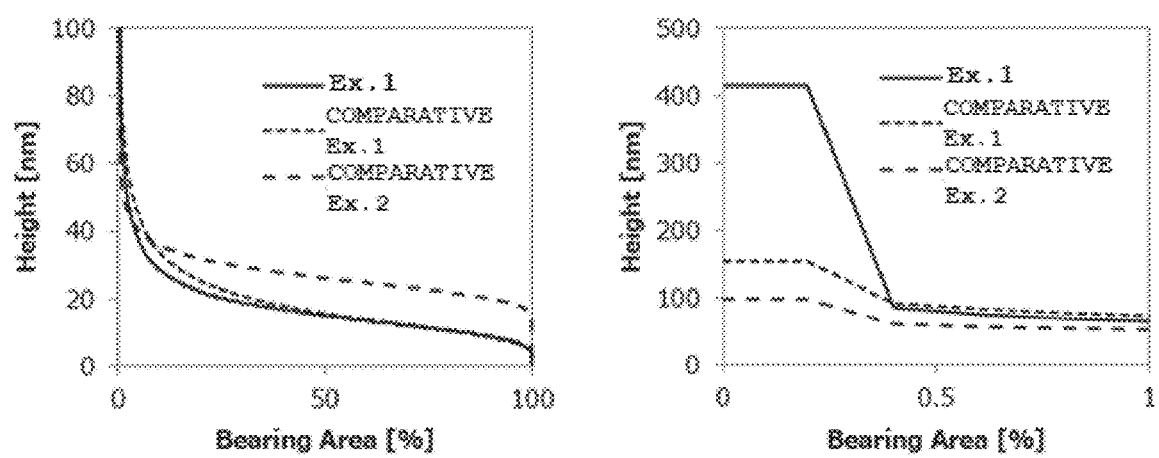
FIG. 2 is a graph showing bearing curves of the rough surfaces of the biaxially oriented polyester films obtained in Example 1 and Comparative Examples 1 and 2, which are measured by a contactless surface shape measurement device.

Incidentally, the "bearing curve", which is also called as a "load curve", is a curve of accumulated frequencies up to the respective heights expressed by percentage, where a sum of the frequencies is assumed to be a hundred, which is obtained by accumulating the respective frequencies of the protrusions from a protrusion that has a highest protrusion mountain part to a protrusion that has a deepest protrusion valley part (or a protrusion having a lowest protrusion height), based on the protrusion height distribution obtained from the measurement by the contactless surface shape measurement device, as shown in FIG. 2. Further, the "protrusion height which corresponds to a 0.4% area" means a protrusion height of which the percentage (a percentage from the highest protrusion mountain part) corresponds to 0.4% in the bearing curve.

Such a protrusion height represents a lowest value of the protrusion height of the protrusion which exists at a predetermined frequency proportion of the highest part of the protrusion mountain part among all of the protrusion heights, and such an index of the protrusion height according to the relative frequency can be obtained by controlling the protrusion heights based on the bearing curve in addition to the relation formula (1) for controlling the absolute values of the respective frequencies of the plural protrusion heights, whereby the higher control of the surface shape can be achieved.

From this point of view, the height of the 0.4% area in the preferable bearing curve is within a range of 67 nm to 87 nm.

The above-described surface property of the present invention may be satisfied by at least one surface of the biaxially oriented polyester film, but is more preferably satisfied by one surface than by both surfaces of the biaxially oriented polyester film, in the light of obtaining both of the winding property in the manufacturing process and the magnetic recording property by controlling the shape of the rough surface, and in the light of enhancing the smoothness of the other surface.

Center line average surface roughness (Ra) of the biaxially oriented polyester film, at least on the surface satisfying the surface property of the present invention, is preferably 3 nm to 9 nm, and is more preferably 4 nm to 8 nm, in the light of obtaining both of the winding property in the manufacturing process and the magnetic recording property.

Moreover, it is preferable to vary center line average surface roughness (Ra) between the surface that satisfies the surface property of the present invention and the other surface, in the light of obtaining both of the winding property in the manufacturing process and the magnetic recording property. More specifically, when measuring the one surface and the other surface of the biaxially oriented polyester film by the contactless surface shape measurement device, the center line average surface roughness of the one surface is higher than that of the other surface preferably by 1 nm or more, and more preferably by 2 nm or more.

[Polyester]

As the polyester contained in the biaxially oriented polyester film of the present invention, polyester that contains dibasic acid and glycol as structural components can be preferably exemplified. For example, as aromatic dibasic acid, terephthalic acid, isophthalic acid, phthalic acid, naphthalenedicarboxylic acid, diphenylsulfonedicarboxylic acid, diphenyletherdicarboxylic acid, diphenylketonedicarboxylic acid, phenylindanedicarboxylic acid, sodium sulfoisophthalic acid, dibromoterephthalic acid, 4,4'-diphenyldicarboxylic acid, 6,6'-(ethylenedioxy)di-2-naphthoic acid and the like can be used. Further, as alicyclic dibasic acid, oxalic acid, succinic acid, adipic acid, azelaic acid, sebacic acid, dimer acid and the like can be used.

As the glycol, as aliphatic diol, ethylene glycol, propylene glycol, tetramethylene glycol, hexamethylene glycol, neopentyl glycol, diethylene glycol and the like can be used; as aromatic diol, naphthalenediol, 2,2bis(4-hydroxydiphenyl) propane, 2,2-bis(4-hydroxyethoxyphenyl)propane, bis(4-hydroxyphenyl)sulfone, hydroquinone and the like can be used; and as alicyclic diol, cyclohexanedimethanol, cyclohexanediol and the like can be used. As the polyester of the present invention, polyester that includes ethylene terephthalate or ethylene-2,6-naphthalenedicarboxylate as a main repeating unit is particularly preferable.

Further, the polyester of the present invention is preferably substantially linear in the light of being produced into films, and a multifunctional compound which has three functional groups or more, for example, glycerin, trimethylolpropane, pentaerythritol, trimellitic acid, trimesic acid, pyromellitic acid, tricarballylic acid, gallic acid and the like may be copolymerized as far as it is substantially linear, and also, a monofunctional compound, for example, o-benzoylbenzoic acid, naphthoic acid and the like may be added to be reacted. Moreover, polyether such as polyethylene glycol, polyether such as polytetramethylene glycol, aliphatic polyester represented by polycaprolactone or the like may be copolymerized.

The polyester of the present invention may be used as a composition obtained by blending the two kinds or more, and resin other than polyester may be blended, as far as the polyester is contained, for example, by 50% by mass or more in the resin component.

Intrinsic viscosity (measured in orthochlorophenol at 25° C.) of the polyester to be used in the present invention has a lower limit value that is preferably 0.50 dl/g, is more preferably 0.51 dl/g and is most preferably 0.52 dl/g, in the light of melt-kneadability, film formability, degradability during melt-extrusion and the like. In particular, in the case of blending the other resin such as below-described polyetherimide, the intrinsic viscosity is preferably the lower limit or more also in the light of the melt-kneadability.

The biaxially oriented polyester film of the present invention may be made of the composition obtained by blending the two kinds or more as described above, and containing at least one kind selected from a group consisting of polyimide, polyether imide, polyether ketone, polyetherether ketone and polyarylate is one of the preferable embodiments. In particular, any of polyether imide and polyarylate is preferably contained. Polyether imide is polymer which contains an aliphatic, alicyclic or aromatic ether unit and a cyclic imide group as a repeating unit, and is not limited as far as it is polymer having melt-formability. Unless losing the effects of the present invention, a main chain of the polyether imide contains a structure unit other than the cyclic imide and ether unit, for example, an aromatic, aliphatic or alicyclic ester unit, an oxycarbonyl unit or the like.

The polyarylate is synthetic resin which has a basic structure of polycondensing dihydric phenol with dibasic acid such as phthalic acid and carboxylic acid, and belongs to amorphous thermoplastic resin.

[Inert Particle]

The biaxially oriented polyester film of the present invention preferably contains inert particles in the polyester resin composing the biaxially oriented polyester film, so that protrusion frequency of a specific protrusion height and a height providing a specific bearing area on at least one of the surfaces may be within appropriate ranges.

As kinds of the inert particles, inorganic particles such as spherical silica, aluminum silicate, titanium dioxide and calcium carbonate are preferable, and as the other organic polymer particles, crosslinked polystyrene particles, crosslinked silicone resin particles, crosslinked acrylic resin particles, crosslinked styrene-acrylic resin particles, crosslinked polyester particles, polyimide particles, melamine resin particles and the like are preferable. The particles may be hollow or not hollow. Also, one kind or more among them can be selected to be used.

A size of the inert particles is preferably 0.01 μm or more and 0.8 μm or less, is further preferably 0.05 μm or more and 0.6 μm or less, and is particularly preferably 0.1 μm or more and 0.4 μm or less. Further, an average particle diameter of the inert particles as a whole is preferably 0.05 μm or more and 0.6 μm or less, and is further preferably 0.1 μm or more and 0.4 μm or less. The inert particles preferably have the average particle diameter as a whole within this range, and further include inert particles having an average particle diameter of 0.25 μm or more and 0.35 μm or less at least in a part. That is, the inert particles preferably include both of: the inert particles having the average particle diameter of 0.25 µm or more and 0.35 µm or less; and the inert particles having the average particle diameter of 0.05 µm or more and less than 0.25 µm.

Examples of a method for adding the inert particles to the polyester resin include plural methods such as: polymerization adding in which the particles are added into a part of a component of raw materials that constitute the resin so as to make a slurry, and the slurry is polymerized directly; kneading in which the inert particles are added into the polymerized resin by a twin screw extruder or the like; and a method in which master polymer containing a large content of the inert particles is prepared, and is diluted with the resin so as to obtain a desired content.

An adding amount of the inert particles is preferably 0.001% by mass or more and 2% by mass or less, is more preferably 0.01% by mass or more and 1% by mass or less, and is particularly preferably 0.1% by mass or more and 0.8% by mass or less with respect to a mass of the layer of the polyester that forms the above-described one surface. Further, in the case of containing the inert particles having the above-described average particle diameter of 0.25 µm or more and 0.35 µm or less, the content of the inert particles having the average particle diameter of 0.25 µm or more and 0.35 µm or less is preferably 0.02% by mass or more and 0.07% by mass or less. Moreover, the inert particles having the average particle diameter of 0.05 µm or more and less than 0.25 µm are preferably contained by 0.03% by mass or more and 0.5% by mass or less.

[Layer Structure]

A layer structure of the biaxially oriented polyester film of the present invention may be a single layer, or may be a laminate of two or more polyester layers, of which front and back surfaces have different center line average surface roughness. In particular, in the case of using the biaxially oriented polyester film as a base of a magnetic recording medium, its layer structure preferably includes two or more layers. If the structure includes two or more layers, there also be a case of not adding the particles into resin that constitutes an outermost layer.

For improving cohesion with the magnetic layer and slidability of the film itself, a coating layer may be provided onto the biaxially oriented polyester film of the present invention, unless losing the effects of the present invention. In this case, a surface of the coating layer or a surface with no coating layer provided may satisfy the surface property of the present invention, but the surface with no coating layer provided preferably satisfies the surface property of the present invention.

[Method for Manufacturing Biaxially Oriented Polyester Film]

A method for manufacturing the biaxially oriented polyester film of the present invention can adopt a well-known method, or the biaxially oriented polyester film can be manufactured, for example, by: extruding the polymer from a die to form a sheet shape by a single extruder, or laminating different kinds of polymer in melted states by using two or more extruders and subsequently extruding them from a die to form a sheet shape; cooling and solidifying the thus obtained sheet-shaped product(s) to form a single-layer or laminated unstretched film; stretching the obtained unstretched film preferably in one direction or in two directions that are perpendicular to each other; and treating the thus stretched film by heat.

A temperature in the process of extruding the film in the melted state is not limited particularly, as far as unmelted polymer does not exist, and heat deterioration of the resin does not excessively proceed, and the film is preferably extruded at a temperature of, for example, a melting point of the resin (Tm: ° C.) to (Tm+70)° C.

Next, for cooling the unstretched film, in order to maintain the flatness of the obtained unstretched film and cause less thickness unevenness, it is preferable that a rotating cooling drum disposed below the die along the film formation direction is used, and the sheet-shaped product is cohered to the drum so as to be cooled.

During the cooling, for realizing the surface property of the present invention, smoothness of a surface of the cooling drum is preferably enhanced, and surface finish of the cooling drum is preferably 1.0 S or less, and is more preferably 0.5 S or less, in the light of controlling the height of the 0.4% area of the bearing curve with high accuracy.

If a predetermined thickness and Young's modulus are attained, it is not impossible to use the unstretched film as it is, but in order to realize superior processability at a high temperature, the unstretched film is preferably subjected to stretching operation so as to form a film having the predetermined thickness and Young's modulus.

The stretching method is not limited particularly, and includes methods such as vertical uniaxial stretching, transverse uniaxial stretching, sequential biaxial stretching and simultaneous biaxial stretching, but the sequential biaxial stretching will be explained here. The vertical uniaxial stretching is the sequential biaxial stretching from which transverse stretching is omitted, the transverse uniaxial stretching is the sequential biaxial stretching from which vertical stretching is omitted, and simultaneous biaxial stretching is stretching in the vertical direction and the transverse direction simultaneously. In the sequential biaxial stretching, the unstretched film is stretched in a uniaxial direction (usually, in a vertical direction) at magnification of 2× or more and preferably at magnification of 2.5× or more at a temperature of (Tg−10)° C. to (Tg+60)° C. on the basis of a glass transition temperature (Tg: ° C.) of the resin, and is subsequently stretched in a direction perpendicular to the above-described stretching direction at magnification of 2× or more and preferably at magnification of 2.5× or more at a temperature of Tg° C. to (Tg+60)° C. Further, the thus stretched film may be stretched again in the vertical direction and/or the transverse direction as necessary.

In particular, the stretching in the transverse direction is favorably conducted in two steps, so that the protrusion frequency in a specified range of the protrusion height in the present invention and the height of the 0.4% area of the bearing curve may be within specified ranges. Further, the resin film after being stretched can be set by heat at a temperature of (Tm−70)° C. to (Tm−10)° C., where a melting point of the resin is denoted by Tm. A thermo-setting time is preferably 0.1 seconds to 60 seconds.

[Magnetic Recording Tape]

The biaxially oriented polyester film of the present invention can be used as a base tape of favorably a magnetic recording tape, further favorably a high density magnetic recording tape, and particularly favorably a digital recording-type magnetic recording tape. That is, the magnetic recording tape includes the biaxially oriented polyester film of the present invention as the base film. Then, the magnetic recording tape using the biaxially oriented polyester film of the present invention will be further described.

The magnetic recording tape can be produced by forming a magnetic layer onto the above-described biaxially oriented polyester film of the present invention. At this time, it is preferable to form the magnetic layer to the back surface opposite to the front surface that satisfies the surface property of the present invention. Incidentally, to the front surface of the biaxially oriented polyester film of the present invention, a coating layer or the like which has a well-known easily adhering function by itself may be formed for improving the adhesion to the magnetic layer or the like, unless losing the effects of the present invention as described above.

The magnetic layer for forming the magnetic recording tape is not limited particularly, but is formed by: uniformly dispersing needle fine magnetic powder that is iron, or contains iron as a main component, or barium ferrite into a binder of polyvinyl chloride, vinyl chloride-vinyl acetate copolymer or the like; and applying the thus obtained coating liquid, and then, the magnetic recording tape can have excellent dimensional stability, electromagnetic conversion property and error rate performance by using the biaxially oriented polyester film of the present invention as described above.

By the way, in order to increase the recording density as described above, the magnetic substance is required to be refined, so that removal of a solvent or the like from the coating liquid becomes difficult, whereby the drying and the like become necessary to be carried out at a higher temperature for maintaining its processability.

Incidentally, the coating liquid is applied so that the magnetic layer may have a thickness of preferably 1 μm or less and further preferably 0.02 μm to 0.5 μm, in the light of obtaining a high density recording coat-type magnetic recording tape which has excellent electromagnetic conversion property such as output, S/N and C/N particularly in a short wavelength region, and causes less dropout or error rate. Further, as necessary, a nonmagnetic layer which contains fine titanium oxide particles and the like is also preferably provided as a ground layer of the coat-type magnetic layer by being dispersed into an organic binder similar to that of the magnetic layer.

Further, onto the front surface of the magnetic layer, a protection layer of diamond-like carbon (DLC) or the like and a fluorine-containing carboxylic acid-based lubricant layer may be provided sequentially, depending on a purpose, application and necessity, and onto the other surface, a well-known back coat layer may be provided.

The thus obtained coat-type magnetic recording tape is significantly useful as a magnetic recording tape for data purpose such as LTO and enterprise. In particular, according to the present invention, since the smooth magnetic layer surface can be realized by controlling the transfer, recording density of a linear tape can be dramatically improved, whereby the coat-type magnetic recording tape can be favorably used for, in particular, an ultra high density recording medium with a storage capacity of more than 5 TB.

EXAMPLES

The present invention will be described below in more detail by way of Examples and Comparative Examples. Incidentally, in the present invention, properties are measured and evaluated by below-described methods. Hereinafter, unless particularly specified, "parts" means "parts by mass", and "%" means "% by mass".
(1) Thickness of Film
A thickness of ten films, which were piled so as not to incorporate dust, was measured by a dot-type electronic micrometer, and a film thickness per one film was calculated.

(2) Surface Roughness
Surface roughness was measured 10 times at different measurement points by a contactless surface shape measurement device (produced by Zygo Corporation: NewView7300) under conditions of: measurement magnification of 25× by using a 50× objective lens at zoom magnification of 0.5×; and measurement area of 282 μm×211 μm (=0.0595 mm$^2$), and an average value thereof was denoted as center line average surface roughness (Ra). Incidentally, in the examples and the like, a surface having higher center line average surface roughness (Ra) was called as a rough surface, and a surface having lower Ra was called as a flat surface.
(3) Protrusion Frequency
From measurement data of a surface having higher Ra which was obtained from the above-described surface roughness measurement (rough surface), where a reference band was set at 10 nm in Metro Pro, an analyzing software incorporated in the surface shape measurer, peaks at a slice level of 5 nm were extracted as protrusions, protrusion heights were summed up per 0.005 μm so as to obtain a protrusion number, the protrusion number was integrated from a higher protrusion, and an average value of N=10 was determined as a protrusion frequency. Herein, base-10 logarithm values of protrusion frequencies of the protrusion heights of 0.075 μm, 0.100 μm and 0.125 μm were obtained. In addition, the protrusion frequencies of the protrusion heights of 0.075 μm, 0.100 μm and 0.125 μm mean protrusion frequencies of the protrusion heights of 0.075 μm or more, 0.100 μm or more and 0.125 μm or more, respectively. Incidentally, FIG. 1 is a graph showing a relation between the protrusion heights and the frequencies of the rough surface of the biaxially oriented polyester films obtained in Example 1 and Comparative Examples 1 and 2, which were measured by the contactless surface shape measurement device.
(4) 0.4% Height of Bearing Curve
After drawing a bearing curve by an analysis software (Produced by Image Metrology: SPIP) from the measurement data of the surface having higher Ra which was obtained from the above-described surface roughness measurement (the rough surface), a slice level at which the bearing area of this bearing curve was 0.4% was read as a height, thereby obtaining an average value at N=10. Incidentally, FIG. 2 shows the bearing curves of the rough surfaces of the biaxially oriented polyester films obtained in Example 1 and Comparative Examples 1 and 2, which were measured by the contactless surface shape measurement device.
(5) Film Winding Property
After forming the biaxially oriented polyester film and winding it once, the 100 films were wound at speed of 80 m/minute while being slit to have a size of 1 m in width and 10,000 m in length, whereby a film winding property was judged from a ratio of good products with no defect such as wrinkles, end face misalignment and surface protrusions.
⊙: Good Product Rate Was 95% or More
○: Good Product Rate Was 90% or More
X: Good Product Rate Was Less than 90%
(6) Production of Magnetic Recording Tape
A film which was slit to have a width of 1 m was conveyed at tension of 2 kg/mm$^2$, a magnetic coating material and a nonmagnetic coating material were applied to one surface of a support according to the following description, a back coating layer was applied to an other surface, and the film was slit to have a width of 12.65 mm, thereby producing a pancake (sheared roll). Subsequently, a length of 900 m of this pancake was put into a cassette, thereby producing a magnetic recording tape.

<Magnetic Layer-Forming Coating Liquid>

| | |
|---|---|
| Barium Ferrite Magnetic Powder | 100 Parts |
| (Plate Diameter: 20.5 nm, Plate Thickness: 7.6 nm, Plate Ratio: 2.7, Hc: 191 kA/m (≈2400 Oe), Saturation Magnetization: 44 $Am^2$/kg, BET Specific Surface Area: 60 $m^2$/g) | |
| Polyurethane Resin | 12 Parts |
| Weight Average Molecular Weight | 10,000 |
| Sulfonic Acid Functional Group | 0.5 meq/g |
| α-Alumina HIT60 (Produced by Sumitomo Chemical Co., Ltd.) | 8 Parts |
| Carbon Black #55 (Produced by ASAHI CARBON CO., LTD) | 0.5 Parts |
| Particle Size | 0.015 μm |
| Stearic Acid | 0.5 Parts |
| Butyl Stearate | 2 Parts |
| Methylethylketone | 180 Parts |
| Cyclohexanone | 100 Parts |

<Nonmagnetic Layer-Forming Coating Liquid>

| | |
|---|---|
| Nonmagnetic Powder α-Iron Oxide | 85 Parts |
| Average Longer Axis Length 0.09 μm, | |
| BET Specific Surface Area: | 50 $m^2$/g |
| pH | 7 |
| DBP Oil Absorption | 27 ml/100 g to 38 ml/100 g |
| Surface Conditioning Layer $Al_2O_3$ | 8% by mass |
| Carbon Black | 15 Parts |
| "Conductix" (Registered Trademark) SC-U (Produced by Columbian Carbon Company) | |
| Polyurethane Resin UR8200 (Produced by TOYOBO CO., LTD.) | 22 Parts |
| Phenylphosphonic Acid | 3 Parts |
| Cyclohexanone | 140 Parts |
| Methylethylketone | 170 Parts |
| Butyl Stearate | 1 Part |
| Stearic Acid | 2 Parts |
| Methylethylketone | 205 Parts |
| Cyclohexanone | 135 Parts |

The respective components of each of the above-described coating liquid (the magnetic layer-forming coating liquid and the nonmagnetic layer-forming coating liquid) were kneaded by a kneader. The coating liquid was poured by a pump into a horizontal sand mill, in which zirconia beads of 1.0 mmφ were filled by 65% by volume with respect to a volume of a dispersing part, and the coating liquid was dispersed at 2,000 rpm for 120 minutes (a time period when the zirconia beads were substantially retained in the dispersing part). Then, 5.0 parts of isocyanate was added to the obtained dispersion liquid for the coating material of the nonmagnetic layer, and 2.5 parts of isocyanate was added to the obtained dispersion liquid for the coating material of the magnetic layer, and 3 parts of methylethylketone was further added to each of the dispersion liquid, and each of the obtained liquid was filtered with a filter having an average hole diameter of 1 μm, thereby preparing each of the nonmagnetic layer-forming coating liquid and magnetic layer-forming coating liquid.

The thus obtained nonmagnetic layer-forming coating liquid was applied onto a flat surface of the film so that a thickness of the coating liquid after being dried might be 0.6 μm, and was dried, the magnetic layer-forming coating liquid was subsequently applied so that a thickness of the magnetic layer after being dried might be 0.07 μm, and the magnetic layer was oriented by a cobalt magnet having magnetic force of 6,000 G (600 mT) and a solenoid having a magnetic force of 6,000 G (600 mT) while the magnetic layer was still wet, and was then dried.

Thereafter, a back-coat layer (100 parts of carbon black having an average particle diameter of 17 nm, 80 parts of calcium carbonate having an average particle diameter of 40 nm and 5 parts of α-alumina having an average particle diameter of 200 nm were dispersed into urethane resin and polyisocyanate) was applied onto the rough surface of the film so that a thickness of the back-coat layer after calendar treatment might be 0.4 μm. Subsequently, the back-coat layer was subjected to the calendar treatment in a calendar at a temperature of 90° C. and linear pressure of 300 kg/cm (294 kN/m), and was cured at 70° C. for 48 hours. Further, nonwoven fabric and a razor blade were attached to an apparatus provided with a device of exporting and winding the slit product so that the nonwoven fabric and the razor blade might be pressed against a magnetic surface, and a surface of the magnetic layer was cleaned by the tape cleaning device, thereby obtaining the magnetic recording tape.

(7) Electromagnetic Conversion Property

A recording head (MIG, gap 0.15 μm, 1.8 T) and a reproducing GMR head were attached to a drum tester, and an output of the magnetic recording tape obtained in above (6) was measured. By setting relative speed of the head/tape at 15 m/sec, signals of track density of 16KTPI and linear recording density of 400 Kbpi were recorded, and then, a ratio between the output and noise was represented as an electromagnetic conversion property. Where the value obtained in Example 1 was defined as 0 dB, +2 dB or more was evaluated as ⊙, 0 dB to less than +2 dB was evaluated as ○, and less than 0 dB was evaluated as X.

(8) Dropout

A LTO8 drive produced by International Business Machines Corporation was loaded with the magnetic recording tape obtained in above (6) so as to record and reproduce 14 GB of data signals. Where a signal having an amplitude (P-P value) which is 50% or less of an average signal amplitude was defined as a missing pulse, and four or more continuous missing pulses were detected as a dropout. Incidentally, the dropout was judged based on below-described criteria by evaluating one volume of the magnetic recording tape having a length of 900 m, and calculating the number of the dropouts into a number per 1 m.

⊙: Less than Three Dropouts/m

○: Three Dropouts/m or More and Less than 9 Dropouts/m

X: Nine Dropouts/m or More

Example 1

Using two extruders: an extruder 1 for forming a polyester layer on a rough surface side; and an extruder 2 for forming a polyester layer on a flat surface side, a laminate unstretched film was manufactured by coextrusion as described below. In the extruder 1, 0.06% by mass of crosslinked polystyrene particles having an average particle diameter of 0.3 μm and 0.12% of 0.1 μm spherical silica particles were allowed to be contained in polyethylene-2,6-naphthalenedicarboxylate having intrinsic viscosity (ortho-chlorophenol, 35° C.) of 0.60 dl/g so as to produce a PEN resin composition 1. This PEN resin composition 1 in a chip state was supplied after being dried at 180° C. for 5 hours. In the extruder 2, 0.1% by mass of spherical silica having an average particle diameter of 0.1 μm was allowed to be contained in polyethylene-2,6-naphthalenedicarboxylate having intrinsic viscosity of 0.60 dl/g so as to produce a PEN resin composition 2. This PEN resin composition 2 was dried similarly to the PEN resin composition 1 and supplied, and the PEN resin compositions 1 and 2 were merged so that a thickness ratio between resin 1 and resin 2 might be 55/45, were extruded from a T-type extrusion die onto a casting drum which was subjected to surface finish for 0.3 S and had a surface temperature kept at 60° C. so that the PEN resin compositions 1 might contact the casting drum, and were quenched to be solidified, thereby obtaining the laminate unstretched film.

The thus obtained laminate unstretched film was preheated at 120° C., and was further heated by an infrared heater having a surface temperature of 830° C. from 14 mm thereabove between low-speed and high-speed rolls so as to be stretched 4.8 times, was quenched, was subsequently supplied to a tenter, was stretched 4.6 times in a transverse direction at 150° C., was thereafter quenched, was then heated at 180° C. again so as to be stretched 1.25 times in the transverse direction, and was set by heat at 215° C. for 3 seconds, thereby obtaining a laminate-structured biaxially oriented polyester film having a thickness of 4.5 μm. Properties of the obtained film will be shown in Table 1.

Examples 2 to 4

A laminate-structured biaxially oriented polyester films were obtained similarly to Example 1 except for changing the kind and the adding amount of the particles to be added and the film thickness as listed in Table 1. Properties of the obtained films will be shown in Table 1.

<Production of PET-based Raw Material>

(1-a) Production of PET Pellets: 194 parts by mass of dimethyl terephthalate and 124 parts by mass of ethylene glycol were put into a transesterification device, and the contents were heated at 140° C. to be melted. Thereafter, while the contents were stirred, 0.3 parts by mass of magnesium acetate tetrahydrate and 0.05 parts by mass of antimony trioxide were added thereto, and transesterification was caused while methanol was distilled at 140° C. to 230° C. Subsequently, 0.5 parts by mass of ethylene glycol solution of trimethylphosphate of 5% by mass (0.025 parts by mass as trimethylphosphate) and 0.3 parts by mass of ethylene glycol solution of sodium dihydrogenphosphate dihydrate of 5% by mass (0.015 parts by mass as sodium dihydrogenphosphate dihydrate) were added.

When adding the ethylene glycol solution of trimethylphosphate, a temperature of the reaction contents was decreased. Then, while excessive ethylene glycol was distilled, the reaction contents were continued to be stirred until the temperature of the reaction contents recovered to 230° C. After the temperature of the reaction contents in the transesterification device reached 230° C. as described above, the reaction contents were moved into a polymerizer.

After moving, the temperature of the reaction system was increased gradually from 230° C. to 275° C., pressure thereof was decreased to 0.1 kPa. Both of time periods for reaching a final temperature and final pressure were 60 minutes. After reaching the final temperature and the final pressure, the reaction system was reacted for 2 hours (3 hours from start of the polymerization), a stirring torque of the polymerizer became a predetermined value (its specific value is different according to a specification of the polymerizer, but a value shown by polyethylene terephthalate having intrinsic viscosity of 0.55 in this polymerizer was defined as the predetermined value). Then, the reaction system was purged by nitrogen and the pressure thereof was recovered to the normal pressure so as to stop the polycondensation reaction, and the reaction product was ejected into cold water to have a strand shape, and was immediately cut, thereby obtaining PET pellets of the polyethylene terephthalate having intrinsic viscosity (orthochlorophenol, 35° C.) of 0.55 dl/g (Raw Material-1a).

Using a rotating vacuum polymerizer, the above-described PET pellets (Raw Material-1a) was treated by heat at a temperature of 230° C. under reduced pressure of 0.1 kPa for a long time period so as to cause solid-state polymerization until obtaining intrinsic viscosity (orthochlorophenol, 35° C.) of 0.70 dl/g (Raw Material-1ak).

(2) Production of Particle-containing PET Pellets (Raw Material-2a): 90 parts by mass of the above-described solid-state polymerized PET pellets (Raw Material-1ak: treatment time of 2 hours) and 10 parts by mass of water slurry of crosslinked polystyrene particles having an average diameter of 0.30 μm of 10% by mass (1 part by mass as the crosslinked polystyrene particles) were supplied into a vent-type twin screw kneading extruder which is a same direction rotation type heated at 280° C., and the water was removed while a bent hole was kept to have a pressure reduction degree of 1 kPa or less, thereby obtaining particle-containing pellets which contained 1% by mass of the crosslinked polystyrene and had intrinsic viscosity (orthochlorophenol, 35° C.) of 0.62 dl/g (Raw Material-2a).

(3) Production of Particle-Containing PET Pellets (Raw Material-2b): 90 parts by mass of the above-described solid-state polymerized PET pellets (Raw Material-1ak: treatment time of 2 hours) and 10 parts by mass of water slurry of spherical silica particles having an average diameter of 0.10 μm of 10% by mass (1 part by mass as the spherical silica particles) were supplied into a vent-type twin screw kneading extruder which is a same direction rotation type heated at 280° C., and the water was removed while a bent hole was kept to have a pressure reduction degree of 1 kPa or less, thereby obtaining particle-containing pellets which contained 1% by mass of the spherical silica and had intrinsic viscosity (orthochlorophenol, 35° C.) of 0.62 dl/g (Raw Material-2b).

(4) Production of Bicomponent Composition (Mass Ratio of PET/PEI=50/50) Pellets (Raw Material-3): the solid-state polymerized PET pellets (Raw Material-1ak: treatment time of 2 hours) obtained by the above-described method and pellets of PEI "ULTEM" (Registered Trademark) 1010 produced by SABIC INNOVATIVE PLASTICS LIMITED were supplied into a vent-type twin screw kneading extruder which is a same direction rotation type (produced by Japan Steel Works, LTD., screw diameter of 30 mm, screw length/screw diameter=45.5), which was provided with kneading puddle knead units heated to a temperature of 280° C. at three positions, and were melted and extruded at shearing speed of 100 sec$^{-1}$ for a retention time of 1 minute, thereby obtaining bicomponent composition pellets containing 50% by mass of PEI. Incidentally, a glass transition point of the thus produced bicomponent composition pellets was 150° C. (Raw Material-3).

Example 5

Using two extruders: an extruder 1 for forming a polyester layer on a rough surface side; and an extruder 2 for forming a polyester layer on a flat surface side, a laminate unstretched film was manufactured by coextrusion as described below. In the extruder 1, 74 parts by mass of the PET pellets (Raw Material-1ak), 4 part by mass of the particle-containing PET pellets (Raw Material-2a), 12 parts by mass of the particle-containing PET pellets (Raw Material-2b) and 10 parts by mass of the bicomponent composition pellets (Raw Material-3) were supplied after being respectively dried at 170° C. for 3 hours. In the extruder 2, 84 parts by mass of the PET pellets (Raw Material-1ak), 6 part by mass of the particle-containing PET pellets (Raw Material-2b), and 10 parts by mass of the bicomponent composition pellets (Raw Material-3) were supplied after being respectively dried at 170° C. for 3 hours. These contents were melt in the respective extruders, and were merged so that a layer thickness ratio between two layers of the resin in the melted states might be the rough surface side/the flat surface side=10/90, were extruded from an extrusion die onto a casting drum which was subjected to surface finish for 0.3 S and had a surface temperature kept at 20° C. so that the rough surface side might contact the casting drum, and were quenched to be solidified, thereby obtaining the laminate unstretched film.

The thus obtained laminate unstretched film was preheated at 70° C., and was further heated by an infrared heater having a surface temperature of 800° C. from 14 mm thereabove between low-speed and high-speed rolls so as to be stretched 3 times, was quenched, was subsequently supplied to a tenter, was stretched 4.5 times in a transverse direction at 100° C., and was set by heat at 205° C. for 3 seconds, thereby obtaining a film having a thickness of 4.5 μm. Properties of the obtained film will be shown in Table 1.

Comparative Examples 1 to 2 and 4

Films were obtained similarly to Example 1 except for changing the kind and the adding amount of the particles to be added as listed in Table 1. Properties of the obtained films will be shown in Table 1.

Comparative Example 3

By repeating the operations similar to those in Example 1, a laminate unstretched film was obtained. The thus obtained laminate unstretched film was preheated at 120° C., and was further heated by an infrared heater having a surface temperature of 830° C. from 14 mm thereabove between low-speed and high-speed rolls so as to be stretched 4.8 times, was quenched, was subsequently supplied to a tenter, was stretched 5.75 times in a transverse direction at 170° C., and was set by heat at 215° C. for 3 seconds, thereby obtaining a film having a thickness of 4.5 μm. Properties of the obtained film will be shown in Table 1.

TABLE 1

| | | Resin Layer on Rough Surface | | | | Resin Layer on Flat Surface | | | Film Property Thickness | |
|---|---|---|---|---|---|---|---|---|---|---|
| | | | Particle | | | | Particle | | Total | Thickness Ratio |
| | Polymer Kind | Kind | Particle Diameter μm | Content % | Polymer Kind | Kind | Particle Diameter μm | Content % | μm | Rough Surface/Flat Surface |
| Example 1 | PEN | Crosslinked Pst<br>Spherical Silica | 0.3<br>0.1 | 0.06<br>0.12 | PEN | Spherical Silica | 0.1 | 0.1 | 4.5 | 55/45 |
| Example 2 | PEN | Crosslinked Pst<br>Spherical Silica | 0.3<br>0.1 | 0.05<br>0.12 | PEN | Spherical Silica | 0.1 | 0.07 | 4.5 | 55/45 |
| Example 3 | PEN | Crosslinked Pst<br>Spherical Silica | 0.3<br>0.1 | 0.035<br>0.12 | PEN | Spherical Silica | 0.1 | 0.1 | 4.5 | 55/45 |
| Example 4 | PEN | Spherical Silica<br>Spherical Silica | 0.3<br>0.1 | 0.1<br>0.12 | PEN | Spherical Silica | 0.1 | 0.1 | 3.5 | 55/45 |
| Example 5 | PET + PEI | Crosslinked Pst<br>Spherical Silica | 0.3<br>0.1 | 0.04<br>0.12 | PET + PEI | Spherical Silica | 0.1 | 0.06 | 4.5 | 10/90 |
| Comparative Example 1 | PEN | Crosslinked Pst | 0.3 | 0.075 | PEN | Spherical Silica | 0.1 | 0.1 | 4.5 | 55/45 |
| Comparative Example 2 | PEN | Crosslinked Pst<br>Spherical Silica | 0.2<br>0.1 | 0.05<br>0.2 | PEN | Spherical Silica | 0.1 | 0.1 | 4.5 | 55/45 |
| Comparative Example 3 | PEN | Crosslinked Pst<br>Spherical Silica | 0.3<br>0.1 | 0.06<br>0.12 | PEN | Spherical Silica | 0.1 | 0.1 | 4.5 | 55/45 |
| Comparative Example 4 | PEN | Crosslinked Pst<br>Crosslinked Pst<br>Spherical Silica | 0.6<br>0.3<br>0.1 | 0.005<br>0.035<br>0.12 | PEN | — | — | — | 4.5 | 55/45 |

| | Film Property | | | | | | | |
|---|---|---|---|---|---|---|---|---|
| | Surface Roughness Ra | | Logarithm Value of Protrusion Frequency on | | | Zygo Rough Surface | Tape Property | | |
| | Rough Surface | Flat Surface | Rough Surface Protrusion Height Level | | | 0.4% Height | Winding Property | Electromagnetic Conversion Property | Dropout |
| | nm | nm | 0.075 um | 0.100 um | 0.125 um | nm | | | |
| Example 1 | 7.5 | 3.2 | 1.79 | 1.17 | 0.39 | 85 | ○ | ○ | ○ |
| Example 2 | 6.5 | 3.0 | 1.43 | 0.47 | 0.11 | 79 | ○ | ○ | ○ |
| Example 3 | 5.0 | 2.8 | 0.86 | 0.01 | −0.22 | 70 | ○ | ⊙ | ⊙ |
| Example 4 | 6.7 | 2.9 | 1.47 | 0.50 | 0.14 | 82 | ○ | ⊙ | ⊙ |
| Example 5 | 5.2 | 2.7 | 0.94 | 0.12 | −0.08 | 77 | ○ | ⊙ | ⊙ |
| Comparative Example 1 | 9.3 | 3.5 | 1.86 | 1.29 | 0.73 | 95 | ⊙ | X | X |

TABLE 1-continued

| | | | | | | | | | |
|---|---|---|---|---|---|---|---|---|---|
| Comparative Example 2 | 5.0 | 2.8 | Less than 0 | Less than 0 | Less than 0 | 61 | X | ⊙ | ⊙ |
| Comparative Example 3 | 9.1 | 3.5 | 1.88 | 1.30 | 0.77 | 96 | ○ | X | X |
| Comparative Example 4 | 5.1 | 3.0 | 0.87 | 0.05 | −0.20 | 110 | ⊙ | X | X |

In Table 1, PEN denotes polyethylene-2,6-naphthalenedicarboxylate, PET denotes polyethylene terephthalate, PEI denotes polyether imide, crosslinked Pst denotes crosslinked polystyrene particles, and spherical silica denotes spherical silica particles.

As shown in Table 1, since each of the biaxially oriented polyester films of Examples 1 to 5 satisfied the relation formula (1), and the height of the 0.4% area of the bearing curve was 65 nm or more and less than 90 nm, each of them exhibits an excellent winding property in a base film manufacturing process, and realizes an excellent electromagnetic conversion property and less failure of signals of a magnetic recording tape to be produced thereof.

On the other hand, in Comparative Example 1, which did not satisfy the relation formula (1), and in which the height of the 0.4% area of the bearing curve was too high, the winding property was favorable, but the property of a magnetic recording tape to be produced of the biaxially oriented polyester film was poor. Further, in Comparative Example 2, in which the height of the 0.4% area of the bearing curve was too low, the property of a magnetic recording tape to be produced of the biaxially oriented polyester film was favorable, but the winding property was poor. In Comparative Example 3, which did not satisfy the relation formula (1), and in which the height of the 0.4% area of the bearing curve was too large, the surface roughness was large, and the property of a magnetic recording tape to be produced of the biaxially oriented polyester film was poor. In Comparative Example 4, in which the height of the 0.4% area of the bearing curve was too large, the winding property was favorable, but the tape property was poor.

The biaxially oriented polyester film of the present invention can be favorably used as a base film for a magnetic recording tape, such as, in particular, a high-capacity data storage, can increase recording density, and thus can be favorably used as a data storage or the like with a high memory capacity.

What is claimed is:

1. A biaxially oriented polyester film, wherein a logarithm value y of a protrusion frequency of protrusions having protrusion heights of X or more on at least one surface, which is measured by a contactless surface shape measurement device, satisfies a below relation formula (1), where the protrusion height X is 0.075 μm, 0.100 μm and 0.125 μm, $$y \leq -24.9X + 3.8 \quad (1)$$

(herein, X denotes a protrusion height (μm), y denotes a base-10 logarithm value of a protrusion number of protrusions having protrusion heights of X or more in a visual field of a region of 282 μm×211 μm), and a protrusion height that corresponds to a 0.4% area of a bearing curve based on protrusion height distribution is 65 nm or more and less than 90 nm.

2. The biaxially oriented polyester film according to claim 1, wherein polyester contained in the biaxially oriented polyester film has ethylene terephthalate or ethylene-2,6-naphthalenedicarboxylate as a main repeating unit.

3. The biaxially oriented polyester film according to claim 1, wherein, when measuring the one surface and an other surface of the biaxially oriented polyester film by a contactless surface shape measurement device, center line average surface roughness of the one of the surfaces is higher than center line average surface roughness of the other surface by 1 nm or more.

4. The biaxially oriented polyester film according to claim 3, comprising inert particles.

5. The biaxially oriented polyester film according to claim 3, comprising two or more layers of different polyester layers laminated.

6. The biaxially oriented polyester film according to claim 1, comprising inert particles.

7. The biaxially oriented polyester film according to claim 6, comprising two or more layers of different polyester layers laminated.

8. The biaxially oriented polyester film according to claim 1, comprising two or more layers of different polyester layers laminated.

* * * * *